United States Patent
Clay et al.

(10) Patent No.: US 7,533,279 B2
(45) Date of Patent: May 12, 2009

(54) REMOTE CONTROL SAVE AND SLEEP OVERRIDE

(75) Inventors: Steven Duane Clay, Pflugerville, TX (US); Yvonne Patrice Stoetzel, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 11/424,047

(22) Filed: Jun. 14, 2006

(65) Prior Publication Data

US 2007/0294553 A1    Dec. 20, 2007

(51) Int. Cl.
G06F 1/00 (2006.01)
G06F 15/16 (2006.01)
(52) U.S. Cl. ..................... 713/300; 709/208
(58) Field of Classification Search .......... 713/300; 709/208
See application file for complete search history.

(56) References Cited

U.S. PATENT DOCUMENTS

| | | | | |
|---|---|---|---|---|
| 5,743,743 A | * | 4/1998 | Ho et al. .................. 434/236 |
| 5,907,831 A | * | 5/1999 | Lotvin et al. .............. 705/14 |
| 6,678,824 B1 | * | 1/2004 | Cannon et al. ............. 726/22 |
| 2005/0132237 A1 | * | 6/2005 | Barsuk ..................... 713/300 |
| 2007/0234086 A1 | * | 10/2007 | Bernstein et al. ........... 713/310 |

* cited by examiner

Primary Examiner—Thomas Lee
Assistant Examiner—Ji H Bae
(74) Attorney, Agent, or Firm—Van Leeuwen & Van Leeuwen; Herman Rodriguez (57) ABSTRACT

A method is presented that handles a power down signal received by a device. Other types of signals, such as suspend or save and sleep, may also be handled. A device, such as a parent device, sends a power down signal to another device, such as a child device. The power down signal is received by the child device and acted upon, based on the activities currently being executed by the child device. Each activity currently being executed by the child device is handled according to its corresponding setting in an activity list. For example, if the child device is currently executing a preferred activity, the power down signal is ignored. A user of the child device may also send an explanation (or explanations) to the parent device.

1 Claim, 8 Drawing Sheets

REMOTE CONTROL SAVE AND SLEEP OVERRIDE

BACKGROUND OF THE INVENTION

1. Technical Field

The present invention relates in general to a system and method for remotely powering down or suspending a device. More particularly, the present invention relates to a system and method that ignore a power down signal (or suspend or save and sleep signal) if the device is currently performing a preferred activity.

2. Description of the Related Art

In most homes today, there are a variety of electronic devices used by various people. Often times, several of these devices are connected together via a network, which may be a wireless network. The electronic devices, such as personal computers, personal digital assistants (PDAs), mobile telephones, web-enabled televisions, game devices, personal music devices, etc., are likely to be spread throughout different rooms of the house.

Parents often wish to control their children's use of electronic devices. For example, a parent may decide that a child should stop using his personal computer or other electronic device at a certain time, or after a certain amount of time has elapsed. However, the parent may not be in the same room as the child. Even if the parent is in the same room as the child, the parent may not be aware of which program or activity is currently being executed on the child's electronic device. Further, the parent may decide that it is time for the child's device to be powered down, however, it may be that the child is currently using his or her device to perform an activity of which the parent approves and would wish to continue.

What is needed, therefore, is a system and method that allow someone, such as a parent, to remotely control a device, such as a child's personal computer or other electronic device.

SUMMARY

It has been discovered that the aforementioned challenges are resolved using a method, system, and computer program product for handling a power down signal received by a device. Other types of signals, such as suspend or save and sleep may also be handled. The method, system, and computer program product allow a device, such as a parent device, to send a power down signal to another device, such as a child device. The power down signal is received by the child device and acted upon, based on the activities currently being executed by the child device. An activity list includes a list of activities, along with a corresponding setting for each activity. Each activity currently being executed by the child device is handled according to its corresponding setting in the activity list. For example, if the child device is currently executing a preferred activity, the power down signal is ignored. The present invention also allows a user of the child device to send an explanation (or explanations) to the parent device. A user of the parent device examines the explanations and may then decide to designate a setting for each activity that has been explained. The activities are then handled according to their designated settings.

One embodiment of the present invention is a method that receives a power down signal at a first device, from a second device, and retrieves an activity list that includes one or more listed activities, along with a corresponding setting for each of the listed activities. Each current activity being executed by the first device is identified and the current activities are compared to the listed activities. A setting is determined for one or more of the current activities, and the power down signal is ignored if at least one of the current activities is listed as a preferred activity in the activity list.

In another embodiment, the aforementioned challenges are resolved using an information handling system capable of executing the method described above. In yet another embodiment, the aforementioned challenges are resolved using a computer program product stored in a computer operable media, and containing instructions which, when executed by computer, cause the computer to execute the method described above.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is a method, system, and computer program product that allow a device, such as a parent device, to send a power down signal to another device, such as a child device, in an embodiment of the present invention. The power down signal is received by the child device and acted upon, based on the activities currently being executed by the child device. An activity list includes a list of activities, along with a corresponding setting for each activity. Each activity currently being executed by the child device is handled according to its corresponding setting in the activity list. For example, if the child device is currently executing a preferred activity, the power down signal is ignored. Other possible activity settings are discussed more fully below.

While the described embodiment uses the term "power down signal," it is also possible for the parent device to send other types of signals to the child device. For example, the parent device may send a "suspend signal" or a "save and sleep signal" to the child device. A "suspend" or "save and sleep" signal would put the child device in suspended mode (i.e. put the child device to sleep), and could also be overridden if the child device is currently executing a preferred activity. The parent device may be set to send a particular one of the signals (i.e. power down, suspend, save and sleep), or may select which signal to send depending on the situation at the time. While the remainder of the description will use the term "power down signal," those skilled in the art will understand that other types of signals may be used.

One embodiment of the present invention allows a user of the child device to send an explanation (or explanations) to the parent device. A user of the parent device examines the explanations and may then decide to designate a setting for each activity that has been explained. The activities are then handled according to their designated settings. As discussed above, if any of the currently executing activities are designated as preferred activities, the power down signal may be ignored.

Figure 1:
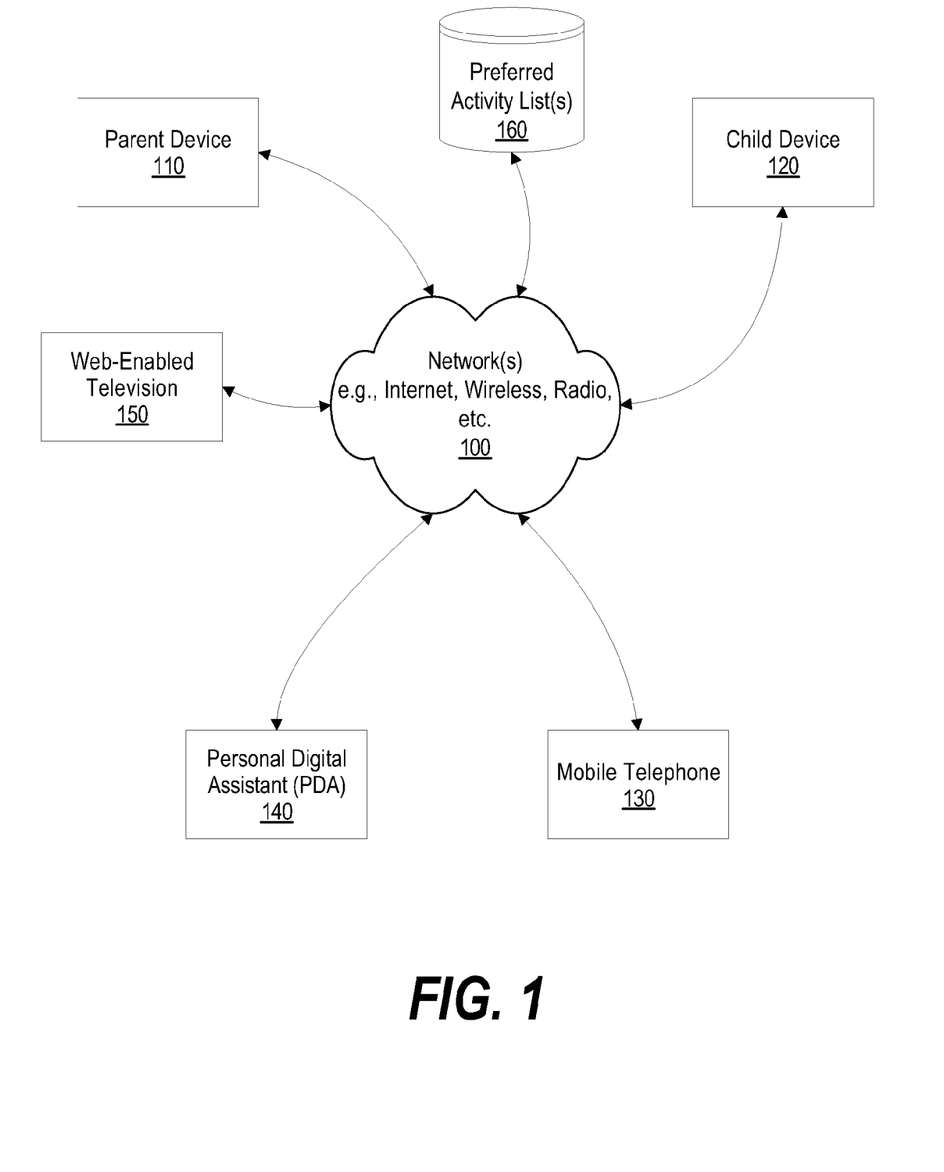
FIG. 1 is an exemplary network diagram depicting devices connected via a network.

FIG. 1 is an exemplary network diagram depicting devices connected via a network. In the example shown, Parent Device 110, Child Device 120, Mobile Telephone 130, Personal Digital Assistant (PDA) 140, and Web-Enabled Television 150 are connected via Network 100. Network 100 may be any type of network, including, but not limited to the Internet, an intranet, a wireless or radio network, a virtual private network (VPN), etc. Network 100 may be a home network that links devices within a home, allowing the devices to communicate with each other.

In the described embodiment, Parent Device 110 and Child Device 120 are personal computers, linked via Network 100. However, those skilled in the art will understand that Parent Device 110 and Child Device 120 may be any of a variety of electronic devices. For example, Parent Device 110 may be a PDA, a remote control device, a mobile phone, etc. Child Device 120 may be a PDA, mobile telephone, stand-alone game device, a web-enabled television, etc.

Preferred Activity List 160 is a list of activities, and corresponding activity settings for the listed activities. An example of a preferred activity list is described below, with reference to FIG. 2. Preferred Activity List 160 may be stored in a variety of formats, preferably in a non-volatile storage, such as a disk storage device. Preferred Activity List 160 is stored in a storage area that is accessible to either Parent Device 110, Child Device 120, or both. Preferred Activity List 160 may be stored, for example, in memory associated with any one of the devices depicted in FIG. 1. Alternately, Preferred Activity List 160 may be stored in memory associated with another device, such as a family or household server (not shown). There may be more than one Preferred Activity List 160, and they may be stored together or in multiple storage areas. For example, each member of the family may have his or her own Preferred Activity List 160. Or there may be a Preferred Activity List 160 associated with each of the devices connected to Network 100.

Figure 2:
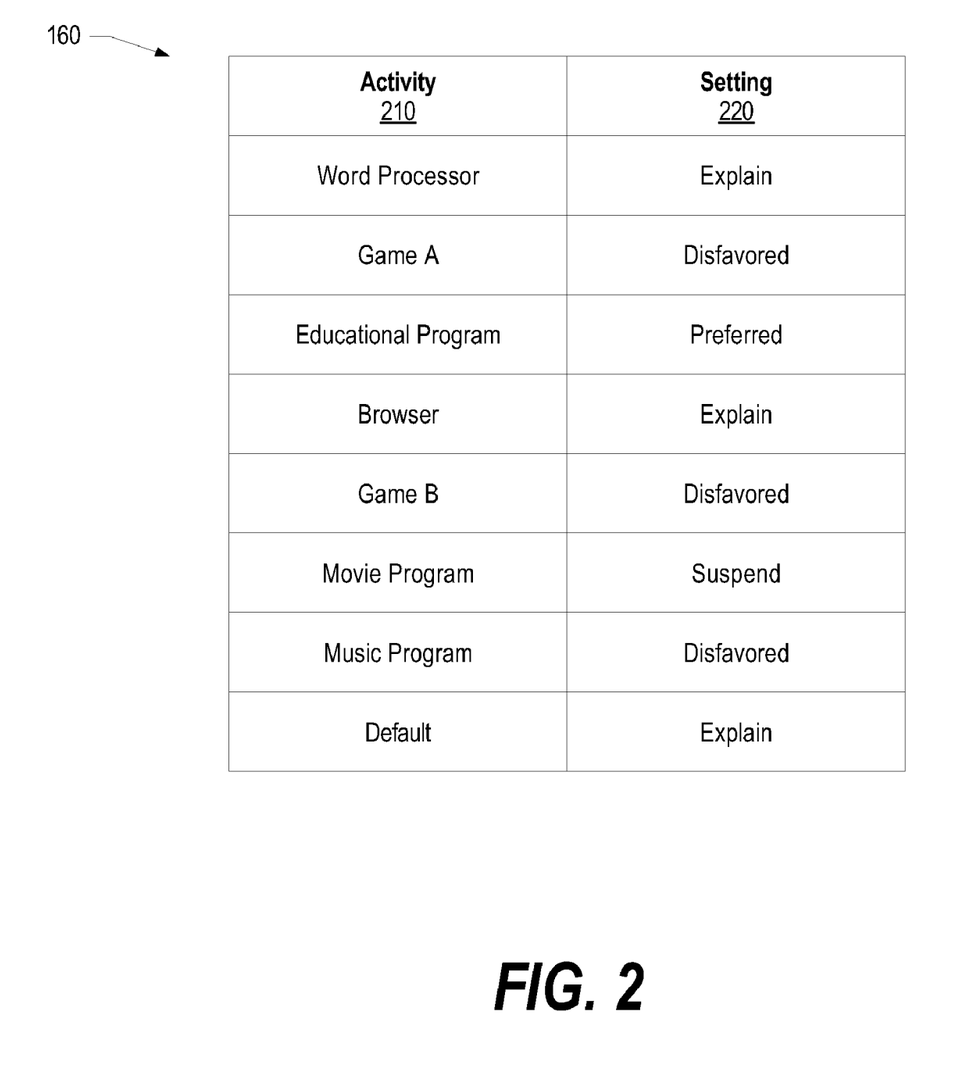
FIG. 2 is an exemplary block diagram of an activity list.

FIG. 2 is an exemplary block diagram of an activity list. In the example shown, there is one list, Preferred Activity List 160. However, as discussed above, there could be multiple lists, each corresponding, perhaps, to a different child device or user. Preferred Activity List 160 may be created and stored by a user using any number of currently existing programs, such as a word processor, spreadsheet, or editor, and Preferred Activity List 160 may be stored in any of a variety of formats.

Preferred Activity List 160 includes Activity List 210, along with Setting List 220. Setting List 220 contains a corresponding setting for each of the activities in Activity List 210. In the described embodiment, there are four possible settings, although there could be any number of possible settings. If a device receives a power down signal, Preferred Activity List 160 is checked for the device. If an activity listed as a "Preferred" activity is currently active in the device, then the power down signal may be ignored. If an activity listed as a "Suspend" activity is currently active in the device, then the activity is saved and closed and the device may be put to sleep, rather than shut down. If an activity listed as a "Disfavored" activity is currently active in the device, the disfavored activity is closed, and the device may be shut down. If an activity listed as an "Explain" activity is currently active in the device, then the user of the device is given an opportunity to explain his or her use of the device/activity. These settings will be described in greater detail below, with reference to FIGS. 3-7.

Activity List 210 includes several programs, listed by program name. "Educational Program" is listed as a "Preferred" activity. "Movie Program" is listed as a "Suspend" activity. "Word Processor" and "Browser" are listed as "Explain" activities. "Game A," "Game B," and "Music Program" are listed as "Disfavored" activities. Note that there is also a "Default" setting, which applies to any programs that are not explicitly listed in Activity List 210. In this case, the "Default" setting is set to "Explain."

Although the activities in Activity List 210 are listed by program name, it is also possible to list activities by program type. For example, there could be one setting that applies to all games, one setting that applies to all multimedia programs, etc.

Figure 3:
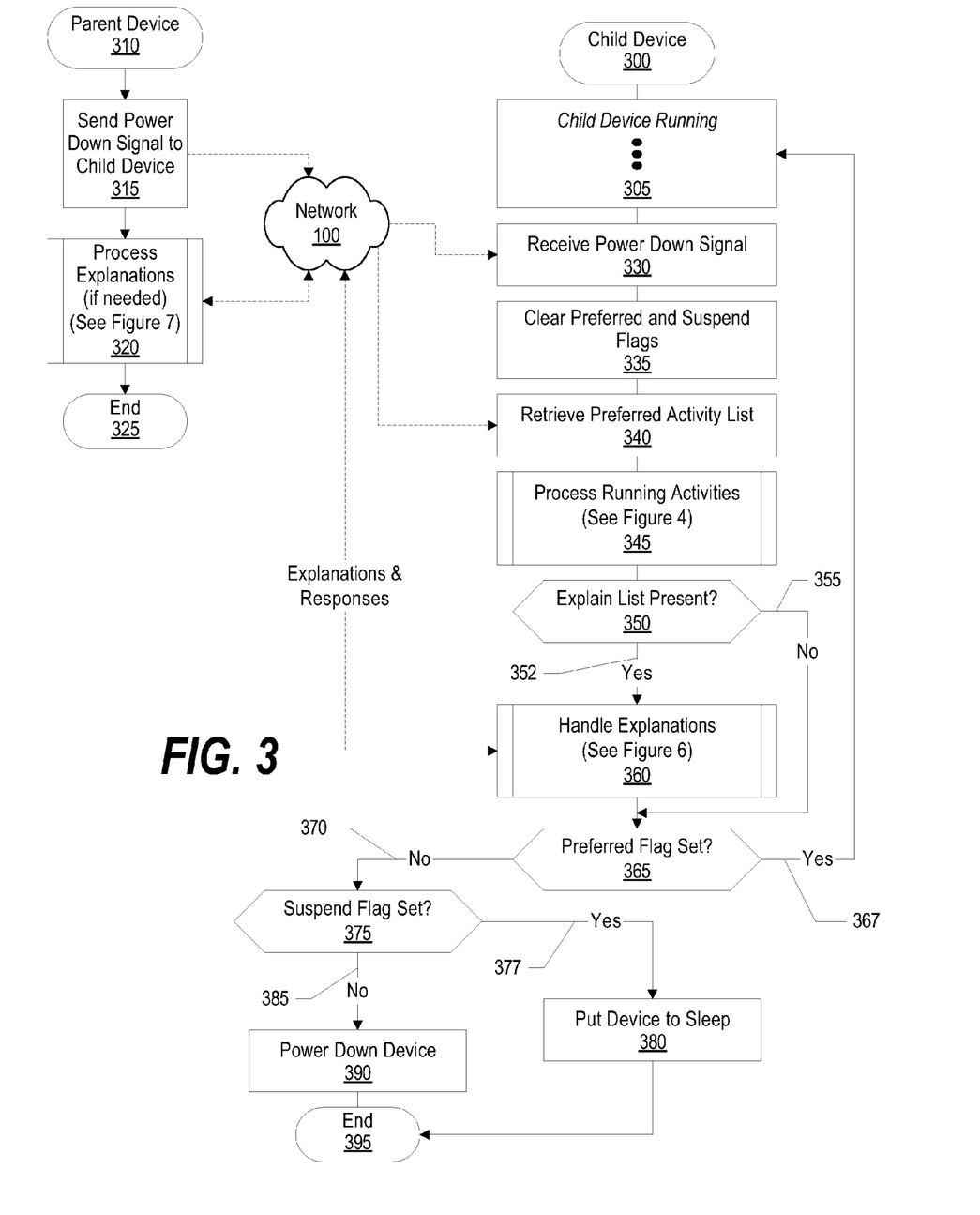
FIG. 3 is an illustrative flow chart depicting interaction between a parent device and a child device when the parent device sends a power down signal to the child device.
Figure 7:
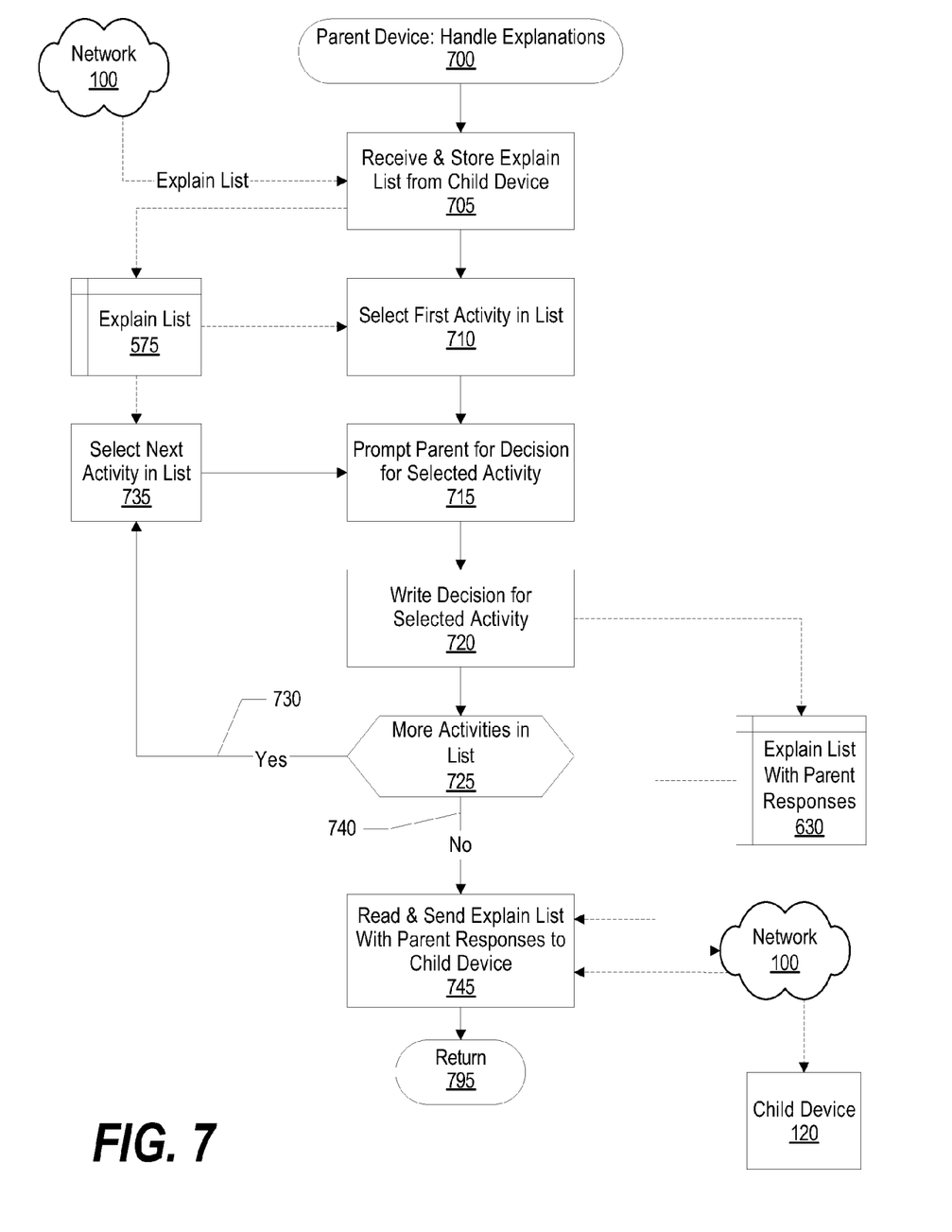
FIG. 7 is an illustrative flow chart depicting a parent device handling a list of explanations.

FIG. 3 is an illustrative flow chart depicting interaction between a parent device and a child device when a parent device sends a power down signal to a child device. Child Device processing begins at 300 whereupon the child device is running (step 305). Any number of activities may be active on the child device. Parent device processing begins at 310 whereupon the parent device sends a power down signal to the child device (step 315) over network 100. As discussed above, the power down signal may be sent over any type of network, and may even be sent via a remote control device. A user may even dial into the network, via a telephone, and send the power down signal. The power down signal may be sent as a result of a user of the parent device deciding to send the power down signal. Alternately, the power down signal may be sent automatically, for example, when a timer has elapsed or at a specified time. The parent device may even query the child device (not shown) in order to get some idea of what activities are currently active before sending the power down signal. The parent device processes explanations, if needed (pre-defined process 320) as depicted in FIG. 7, and then processing ends for the parent device at 325.

Figure 4:
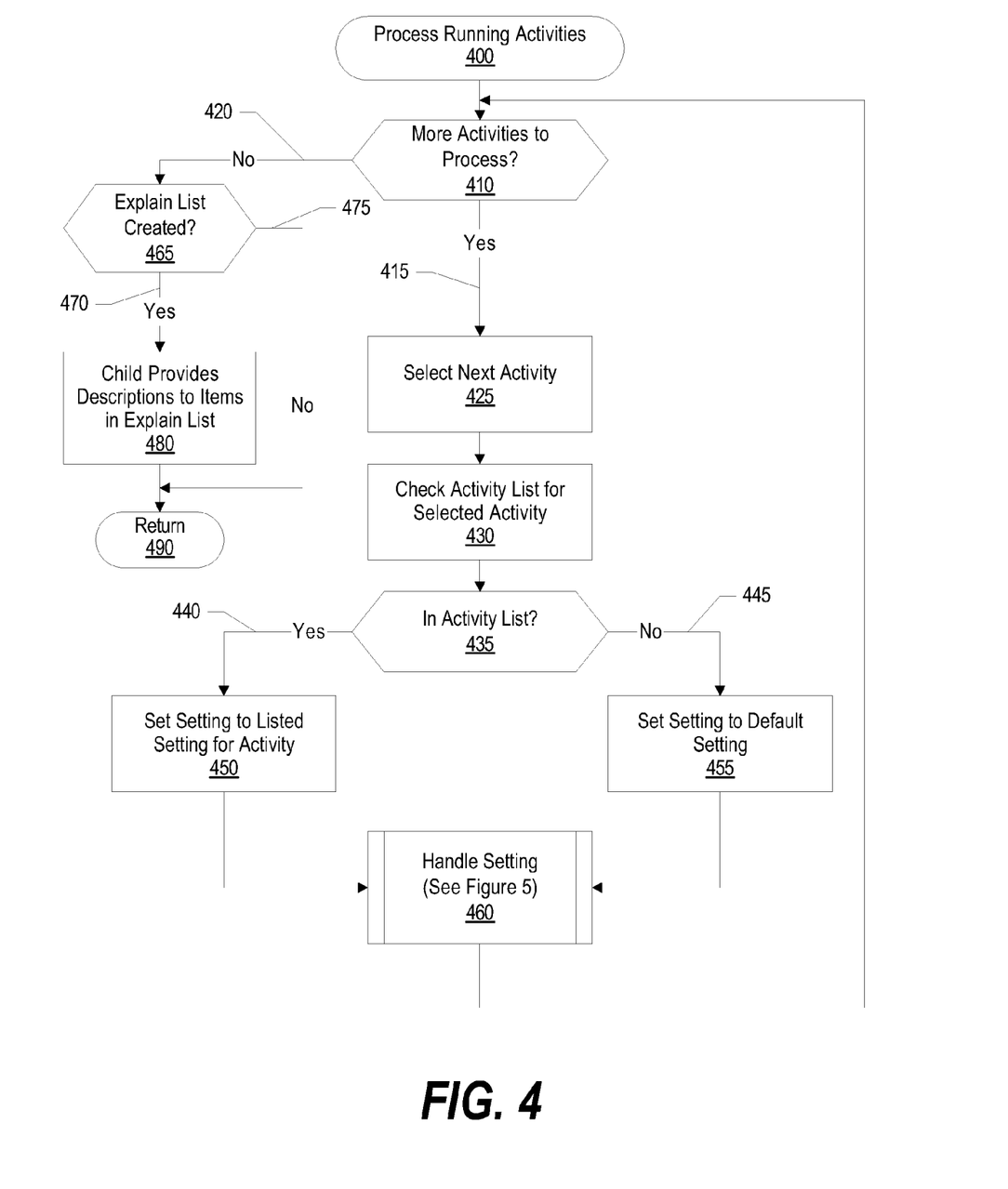
FIG. 4 is an illustrative flowchart depicting the handling of activities that are running (i.e. active or executing) in the child device.
Figure 6:
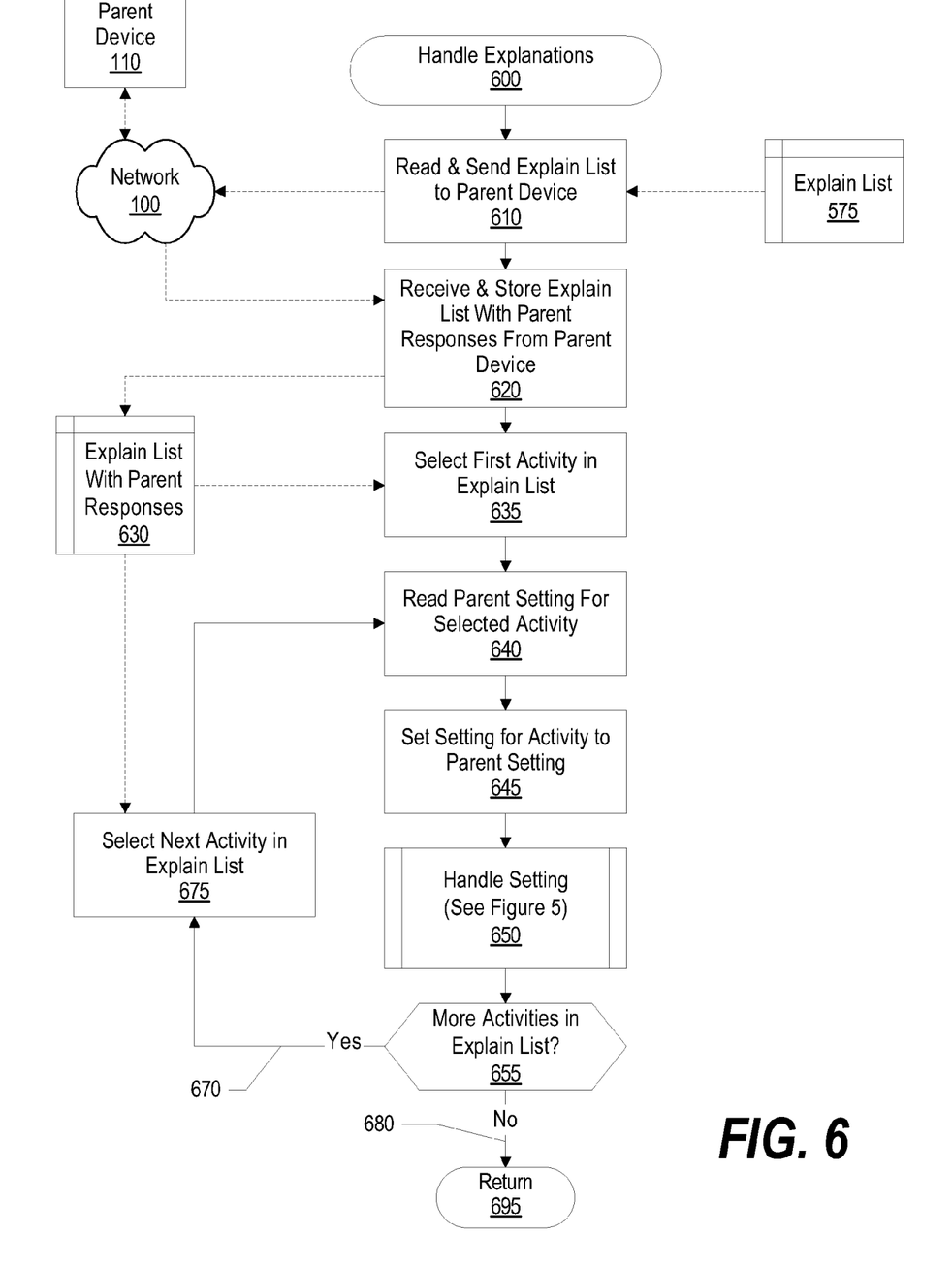
FIG. 6 is an illustrative flow chart depicting a child device handling a list of explanations.

The child device receives the power down signal (step 330) over network 100, and clears a preferred flag and a suspend flag (step 335). These flags are used in later processing to determine whether to shut down the child device or put the child device to sleep. The child device then retrieves the preferred activity list (step 340). The child device processes the activities that are currently running, i.e. active, on the child device (pre-defined process 345) as depicted in FIG. 4. After all the currently running activities are processed, a determination is made as to whether there is an Explain List present (decision 350). If an Explain List is present (which includes both explanations and responses from the parent device, as will be described below), decision 350 branches to "yes" branch 352, whereupon the explanations are handled (pre-defined process) 360 as depicted in FIG. 6. Processing then continues at decision 365. If, however, there is no Explain List, decision 350 branches to "no" branch 355, whereupon processing continues at decision 365.

A check is made to determine whether the preferred flag is set (decision 365). If the preferred flag is set at this point, it indicates that there is at least one preferred activity currently active in the child device, and therefore, the power down signal should be ignored. If the preferred flag is set, decision 365 branches to "yes" branch 367, whereupon the child device continues running at step 305. On the other hand, if the preferred flag is not set, decision 365 branches to "no" branch 370, whereupon a determination is made as to whether the suspend flag is set. If the suspend flag is set at this point, it indicates that at least one activity that is listed as a "Suspend" activity is currently active on the child device, and therefore the child device should be put to sleep (i.e. suspended), rather than shut down. If the suspend flag is set, decision 375 branches to "yes" branch 377, whereupon the child device is put to sleep (step 380). If, however, the suspend flag is not set, decision 375 branches to "no" branch 385, whereupon the child device is powered down. Processing then ends for the child device at step 395.

Note that the described embodiment depicts much of the processing, such as handling running activities and handling explanations, occurring in the child device (i.e. the device that receives the power down signal). However, those skilled in the art will understand that some or all of the processing could take place in the parent device, or in another device that is connected to the child device and the parent device via network 100.

Figure 5:
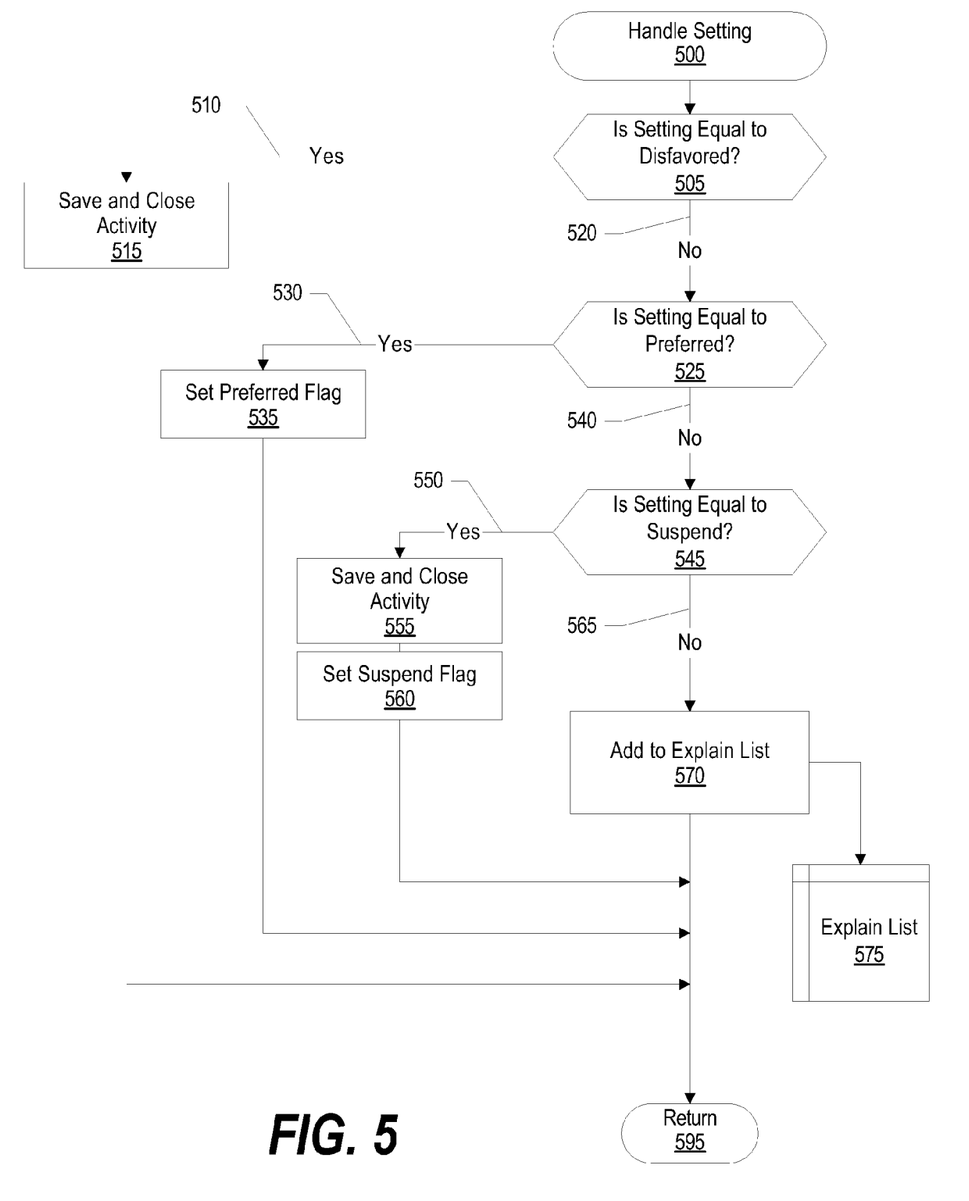
FIG. 5 is an illustrative flowchart depicting the handling of each activity based upon its setting.

FIG. 4 is an illustrative flowchart depicting the handling of activities that are running (i.e. active or executing) in the child device. Processing begins at 400, whereupon a determination is made as to whether there are more activities to process (decision 410). If there are activities to process, decision 410 branches to "yes" branch 415, whereupon the next current activity is selected for processing (step 425). The activity list is checked in order to obtain the setting for the selected current activity (step 430). A determination is made as to whether the current activity is in the activity list (decision 435). If the current activity is listed, decision 435 branches to "yes" branch 440, whereupon the setting for the current activity is set to the corresponding setting in the activity list (step 450). On the other hand, if the current activity is not listed, decision 435 branches to "no" branch 445, whereupon the setting for the current activity is set to the default setting (step 455). Note that there may be an explicit default setting (as shown in FIG. 2), or there may be a default setting defined by a program running in the child device. The selected current activity is then handled according to its setting (pre-defined process 460) as depicted in FIG. 5. Processing then returns to decision 410.

If, at decision 410, it is determined that there are no more activities to process, decision 410 branches to "no" branch 420, whereupon it is determined whether an explain list has been created (decision 465). If an explain list has been created, a user of the child device is given the opportunity to explain his or her use of activities listed in the explain list. If an explain list has been created, decision 465 branches to "yes" branch 470, whereupon the user of the child device provides descriptions to items, i.e. activities, listed in the explain list (step 480), and processing returns at 490. These descriptions may include text input by the user, or may take the form of a checkbox, selecting a button to indicate use, etc. If, for example, the child device is a mobile telephone, the child may provide the telephone number or the name of the person to whom the child is talking. If, on the other hand, there is no explain list, decision 465 branches to "no" branch 475, whereupon processing returns at 490.

FIG. 5 is an illustrative flowchart depicting the handling of each activity based upon its setting. Processing begins at 500 whereupon a determination is made as to whether a setting for a particular activity is set to "Disfavored" (decision 505). If the setting is equal to "Disfavored," decision 505 branches to "yes" branch 510, whereupon the activity is saved and closed (step 515). If, however, the setting is not equal to "Disfavored," decision 505 branches to "no" branch 520, whereupon a determination is made as to whether the setting for the activity is set to "Preferred" (decision 525). If the setting is equal to "Preferred," decision 525 branches to "yes" branch 530, whereupon the preferred flag is set (step 535). If, however, the setting is not equal to "Preferred," decision 525 branches to "no" branch 540, whereupon a determination is made as to whether the setting for the activity is set to "Suspend" (decision 545). If the setting is equal to "Suspend," then decision 545 branches to "yes" branch 550, whereupon the activity is saved and closed (step 555) and the suspend flag is set (step 560). If, on the other hand, the setting is not equal to "Suspend," then decision 545 branches to "no" branch 565.

At this point, in the described embodiment, the only other setting option is "Explain." Therefore, the activity is added to Explain List 575 in step 570. Explain List 575 includes a list of activities whose settings are "Explain." As described above, the user of the child device is given an opportunity to explain his or her use of each of the activities in Explain List 575. The user provides descriptions to items, i.e. activities, listed in the explain list as described above with reference to FIG. 4. Processing then returns at 595

FIG. 6 is an illustrative flow chart depicting a child device handling a list of explanations. Processing begins at 600 whereupon Explain List 575 is read and sent to Parent Device 110 via Network 100 (step 610). Explain List 575 includes a list of activities, along with corresponding explanations from the user of the child device. Explain List 630 is returned from Parent Device 110 and includes a response from the user of Parent Device 110 for each listed activity. The Explain List with Parent Responses 630 is received from Parent Device 110 and stored (step 620). Processing then selects the first activity in the explain list (step 635). The parent setting for the selected activity is read (step 640) and the setting is set to the parent setting for the selected activity (step 645). Note that the settings returned from Parent Device 110 will include "Disfavored," "Preferred," and/or "Suspend." Preferably, the parent device will not be allowed to select a setting of "Explain."

The setting, as set by the Explain List with Parent Responses 630, is then handled (pre-defined process 650) as depicted in FIG. 5. A determination is then made as to whether there are more activities to handle in the explain list (decision 655). If there are more activities to handle, decision 655 branches to "yes" branch 670 whereupon the next activity is selected from Explain List 630 (step 675), and processing continues at step 640. On the other hand, if there are no more activities to handle from the explain list, decision 655 branches to "no" branch 680, whereupon processing returns at 695.

FIG. 7 is an illustrative flow chart depicting a parent device handling a list of explanations. Processing begins at 700 whereupon the parent device receives and stores an explain list, such as Explain List 575, from a child device via Network 100 (step 705). The parent device selects the first activity listed in Explain List 575 (step 710). As discussed above, each activity in Explain List 575 will include a corresponding explanation from a user of the child device. A user of the parent device, such as a parent or teacher, is prompted for a decision for the selected activity (step 715). In the described embodiment, the parent's decision will be to set the activity's setting to "Disfavored," "Preferred," or "Suspend." The decision is written to Explain List with Parent Responses 630 (step 720).

A determination is made as to whether there are more activities in the explain list (decision 725). If there are more activities, decision 725 branches to "yes" branch 730, whereupon the next activity in Explain List 575 is selected (step 735), and processing continues at step 715. On the other hand, if there are no more activities in the explain list, decision 725 branches to "no" branch 740 whereupon the Explain List with Parent Responses 630 is read and sent to Child Device 120 via Network 100 (step 745). Processing returns at 795.

Figure 8:
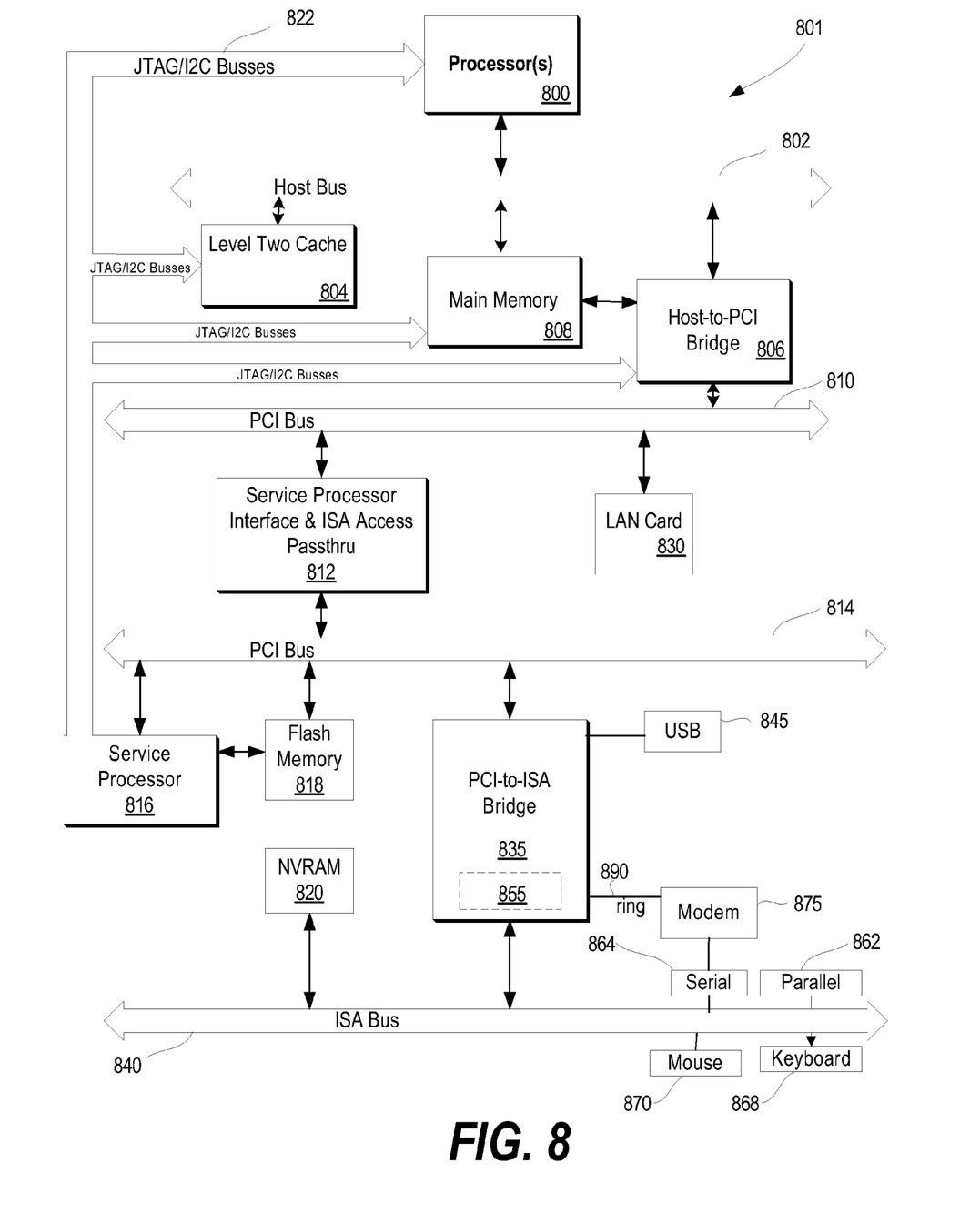
FIG. 8 is an exemplary block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

While the information handling system described in FIG. 8 is capable of executing the processes described herein, this design is simply one example of a computer system design. Those skilled in the art will appreciate that many other computer system designs are capable of performing the processes described herein.

One of the preferred implementations of the invention is an application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for handling a power-down signal at a first device, said method comprising:
  receiving, at the first device, the power-down signal from a second device;
  retrieving an activity list, the activity list including one or more listed activities and a corresponding setting for each of the listed activities;
  identifying one or more current activities being executed by the first device;
  comparing the listed activities to the current activities;

in response to the comparing, determining the setting for one or more of the current activities;

ignoring the power-down signal in response to determining that at least one of the current activities is listed as a preferred activity in the activity list wherein determining that at least one of the current activities is listed as a preferred activity in the activity list further comprises:

identifying that one of the current activities is listed as an explain activity in the activity list;

receiving an explanation from a user of the first device, the explanation relating to the explain activity;

sending the explanation from the first device to the second device; and receiving a response from the second device indicating that the selected activity is a preferred activity;

putting the first device to sleep in response to determining that none of the current activities is listed as a preferred activity in the activity list and at least one of the current activities is listed as a suspend activity in the activity list;

in response to the comparing, further determining that another one of the current activities is listed as a disfavored activity in the activity list, and closing the disfavored activity on the first device in response to determining that the activity is a disfavored activity.

* * * * *